United States Patent
Lee et al.

(10) Patent No.: US 8,572,505 B2
(45) Date of Patent: Oct. 29, 2013

(54) AUTOMATICALLY TESTING A WEB APPLICATION THAT HAS INDEPENDENT DISPLAY TREES

(75) Inventors: Teck Hua Lee, Belmont, CA (US); Gary Look, Medford, MA (US); Hugh Zhang, Medford, MA (US); Diar Ahmed, Walpole, MA (US); Prashant Singh, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 13/017,310

(22) Filed: Jan. 31, 2011

(65) Prior Publication Data

US 2012/0198351 A1    Aug. 2, 2012

(51) Int. Cl.
*G06F 3/048*    (2013.01)

(52) U.S. Cl.
USPC ........... 715/769; 715/719; 715/728; 715/767; 715/792; 715/803; 715/805

(58) Field of Classification Search
USPC ......... 715/744, 719, 728, 767, 769, 792, 803, 715/805
See application file for complete search history.

(56) References Cited

U.S. PATENT DOCUMENTS

| | | | |
|---|---|---|---|
| 5,146,556 A | | 9/1992 | Hullot et al. |
| 5,706,502 A | | 1/1998 | Foley et al. |
| 6,002,871 A | * | 12/1999 | Duggan et al. ................ 717/135 |
| 6,044,398 A | * | 3/2000 | Marullo et al. ............... 709/219 |
| 6,049,664 A | | 4/2000 | Dale et al. |
| 6,157,940 A | * | 12/2000 | Marullo et al. ................ 703/27 |
| 6,272,673 B1 | | 8/2001 | Dale et al. |
| 6,278,449 B1 | | 8/2001 | Sugiarto et al. |
| 6,584,569 B2 | * | 6/2003 | Reshef et al. .................... 726/25 |
| 6,701,514 B1 | * | 3/2004 | Haswell et al. ............... 717/115 |
| 6,907,546 B1 | * | 6/2005 | Haswell et al. ............ 714/38.11 |
| 6,993,712 B2 | | 1/2006 | Ramachandran et al. |
| 7,137,127 B2 | | 11/2006 | Slotznick |
| 7,237,265 B2 | * | 6/2007 | Reshef et al. .................... 726/25 |
| 7,295,953 B2 | * | 11/2007 | Cox et al. ....................... 702/186 |
| 7,313,760 B2 | | 12/2007 | Grossman et al. |
| 7,360,172 B2 | | 4/2008 | Grossman et al. |
| 7,360,174 B2 | | 4/2008 | Grossman et al. |
| 7,412,349 B2 | * | 8/2008 | Moser et al. .................. 702/182 |

(Continued)

OTHER PUBLICATIONS

Bing search q=web+component+visualization+compon Aug. 23, 2013.*

(Continued)

*Primary Examiner* — Boris Pesin
*Assistant Examiner* — John Heffington
(74) *Attorney, Agent, or Firm* — Miles & Stockbridge P.C.

(57) ABSTRACT

An automatic testing application is provided that can simulate a user interaction with a web application. The automatic testing application can determine that the web application has been completely displayed within a graphical user interface of a web browser using a consistent global page state. The automatic testing application can test that the web application has been correctly displayed by verifying a state of a visualization component of the web application using a communication component. Subsequently, the automatic testing application can transmit an event to the web application that can modify the state of the visualization component using the communication component. Once the automatic testing application has determined that the web application has been completely re-displayed, using the consistent global page state, the automatic testing application can test that the web application has been correctly re-displayed by verifying a modified state of the visualization component using the communication component.

20 Claims, 7 Drawing Sheets

(56) References Cited

U.S. PATENT DOCUMENTS

| | | | |
|---|---|---|---|
| 7,418,663 | B2 | 8/2008 | Pettinati et al. |
| 7,430,719 | B2 | 9/2008 | Pettinati et al. |
| 7,437,614 | B2* | 10/2008 | Haswell et al. ............ 714/38.13 |
| 7,549,125 | B2 | 6/2009 | Dunn et al. |
| 7,577,700 | B2* | 8/2009 | Tolson et al. ................. 709/202 |
| 7,636,719 | B2 | 12/2009 | Thompson et al. |
| 7,664,990 | B2* | 2/2010 | Kodaka et al. ............... 714/38.1 |
| 7,765,248 | B2* | 7/2010 | Kanasaki ...................... 709/203 |
| 7,802,191 | B2 | 9/2010 | Pettinati et al. |
| 7,802,230 | B1* | 9/2010 | Mendicino et al. ........... 717/113 |
| 7,805,510 | B2* | 9/2010 | Bansal et al. ................. 709/224 |
| 7,814,438 | B2 | 10/2010 | Grossman et al. |
| 7,953,759 | B2 | 5/2011 | Grossman et al. |
| 8,082,513 | B2 | 12/2011 | Dai et al. |
| 8,195,711 | B2 | 6/2012 | Grossman et al. |
| 8,285,218 | B2* | 10/2012 | Papakostas et al. ........ 455/67.11 |
| 8,386,302 | B1* | 2/2013 | Cohen et al. ................. 705/7.38 |
| 8,402,157 | B2* | 3/2013 | Krassner et al. ............. 709/231 |
| 8,407,600 | B2 | 3/2013 | Pettinati et al. |
| 8,438,481 | B2* | 5/2013 | Lau et al. ...................... 715/716 |
| 8,443,277 | B2* | 5/2013 | Goldman et al. ............. 715/206 |
| 8,458,605 | B2 | 6/2013 | Klask et al. |
| 8,463,630 | B2* | 6/2013 | Hirose et al. ...................... 705/5 |
| 8,495,236 | B1* | 7/2013 | Glasser ......................... 709/231 |
| 8,497,883 | B2* | 7/2013 | Ito ................................. 345/667 |
| 2002/0002596 | A1 | 1/2002 | Sugiarto et al. |
| 2002/0112093 | A1 | 8/2002 | Slotznick |
| 2002/0120666 | A1* | 8/2002 | Landsman et al. ........... 709/200 |
| 2002/0129092 | A1* | 9/2002 | Tolson et al. ................. 709/202 |
| 2004/0100501 | A1 | 5/2004 | Dornback |
| 2004/0103364 | A1 | 5/2004 | Dornback |
| 2004/0194064 | A1* | 9/2004 | Ranjan et al. ................. 717/124 |
| 2005/0193269 | A1* | 9/2005 | Haswell et al. ................. 714/38 |
| 2006/0101404 | A1* | 5/2006 | Popp et al. .................... 717/124 |
| 2007/0245238 | A1* | 10/2007 | Fugitt et al. ................... 715/700 |
| 2008/0209060 | A1* | 8/2008 | Toumi et al. .................. 709/231 |
| 2009/0055801 | A1* | 2/2009 | Kodaka et al. ................ 717/124 |
| 2009/0172511 | A1* | 7/2009 | Decherd et al. ............... 715/207 |
| 2009/0248838 | A1* | 10/2009 | Presetenback et al. ....... 709/219 |
| 2009/0249239 | A1 | 10/2009 | Eilers |
| 2010/0162139 | A1* | 6/2010 | Beebe et al. .................. 715/760 |
| 2011/0053513 | A1* | 3/2011 | Papakostas et al. .......... 455/63.1 |
| 2013/0007786 | A1* | 1/2013 | Papakostas et al. .............. 725/9 |
| 2013/0047232 | A1* | 2/2013 | Tuchman et al. .................. 726/7 |
| 2013/0080785 | A1* | 3/2013 | Ruhlen et al. ................. 713/176 |
| 2013/0085840 | A1* | 4/2013 | Andre ......................... 705/14.45 |
| 2013/0085854 | A1* | 4/2013 | Masuko et al. ............. 705/14.53 |
| 2013/0103796 | A1* | 4/2013 | Fisher et al. .................. 709/217 |
| 2013/0117653 | A1* | 5/2013 | Sukhanov et al. ............ 715/227 |
| 2013/0121599 | A1* | 5/2013 | Shmouely et al. ............ 382/219 |
| 2013/0122980 | A1* | 5/2013 | Lachina et al. .................... 463/9 |
| 2013/0124321 | A1* | 5/2013 | Yamane et al. ............ 705/14.57 |
| 2013/0144662 | A1* | 6/2013 | Waring ............................. 705/5 |
| 2013/0154978 | A1* | 6/2013 | Kim et al. ..................... 345/173 |
| 2013/0169669 | A1* | 7/2013 | Chen et al. .................... 345/619 |
| 2013/0171593 | A1* | 7/2013 | Gorman et al. ............... 434/219 |
| 2013/0171594 | A1* | 7/2013 | Gorman et al. ............... 434/219 |
| 2013/0176246 | A1* | 7/2013 | Kohigashi et al. ............ 345/173 |
| 2013/0198286 | A1* | 8/2013 | Sarbaev et al. ............... 709/204 |
| 2013/0204696 | A1* | 8/2013 | Krassner et al. ........... 705/14.45 |
| 2013/0212465 | A1* | 8/2013 | Kovatch ........................ 715/234 |
| 2013/0216206 | A1* | 8/2013 | Dubin et al. .................. 386/282 |
| 2013/0218729 | A1* | 8/2013 | Cranfill et al. .............. 705/27.1 |
| 2013/0219269 | A1* | 8/2013 | Cranfill et al. ............... 715/256 |
| 2013/0219270 | A1* | 8/2013 | Cranfill et al. ............... 715/269 |
| 2013/0219321 | A1* | 8/2013 | Cranfill et al. ............... 715/776 |
| 2013/0219322 | A1* | 8/2013 | Cranfill et al. ............... 715/776 |

OTHER PUBLICATIONS

Bing search q=web+component+visualization+compon communication Aug. 23, 2013.*

Bing search q=web+component+visualization+compon display Aug. 23, 2013.*

Oracle ADF 11g Primer, "Introduction to the building blocks of a Fusion Web application", an Oracle White Paper, Apr. 2007, pp. 1-12; http://www.oracle.com/technetwork/developer-tool/adf/learnmore/oracle-adf-11g-primer-154277.pdf.

Adobe Flash Player, Copyright 2011 Adobe Systems Incorporated, 1 page; http://www.adobe.com/products/flashplayer/features.

Dynamic HTML, Jan. 25, 2011, pp. 1-5; http://en.wikipedia.org/wiki/Dynamic_HTML.

Conventional Drag-and-Drop, Jan. 25, 2011, pp. 1-3; http://en.wikipedia.org/wiki/Drag_and_drop.

Oracle Application Testing Suite 9.0 Supported with Oracle E-Business Suite, Jan. 25, 2011, pp. 1-7; http://blogs.oracle.com/stevenChan/2009/10/oats_ebs_certified.html.

Selenium, Jan. 24, 2011, 1 page; http://seleniumhq.org/about/how.html.

Flash-Selenium, Jan. 28, 2011, pp. 1-2; http://code.google.p/flash-selenium.

Batik, Java SVG Toolkit, Test Infrastructure, Jan. 28, 2011, pp. 1-5; http://xmlgraphics.apache.org/batik;dev/test.html.

Hugh Zhang, et al., U.S. Appl. No. 13/017,286, filed Jan. 31, 2011.

* cited by examiner

Fig. 7

AUTOMATICALLY TESTING A WEB APPLICATION THAT HAS INDEPENDENT DISPLAY TREES

FIELD

One embodiment is directed to web applications, and more particularly, to web applications that display within a graphical user interface of a web browser.

BACKGROUND

A web application is a computer software application that is accessed over a network, such as the Internet or an intranet. A web application also includes a computer software application that is hosted in a web browser-controlled environment (such as a Java® applet), or coded in a web browser-supported language (such as JavaScript), combined with a web browser-rendered markup language (such as Hypertext Markup Language ("HTML")). A web application is generally reliant upon a web browser that renders the web application executable.

In general, a web application can be tested to verify that the web application correctly displays in a web browser before the web application is put into production. Generally, one or more individuals, such as quality assurance engineers, develop test scripts that can be used to test the web application. A test script can include steps such as loading the web application on a web browser so that the web application displays data, such as a graph, verifying that the image of the graph is correctly displayed, using a cursor control to "click" on a bar in the displayed graph, and verifying whether the resulting image of the graph is correctly displayed. A test script can be a manual test script, where the steps of the test script can be initiated by a human user of the web application. Alternatively, a test script can be an automatic test script, where the steps of the test script can be automated through the use of a separate computer software application that can simulate a human user interacting with the web application. Such testing can be useful in identifying and correcting as many errors as possible in source code of the web application, before the web application is put into production.

SUMMARY

One embodiment is directed to a computer-readable medium having instructions stored thereon that, when executed by a processor, cause the processor to automatically test a web application. The instructions include determining that the web application has completely displayed in a graphical user interface of a web browser using a consistent global page state. The web application includes a web component and a visualization component. The web component is displayed in the graphical user interface using a first display tree. The visualization component is displayed using a second display tree. The instructions further include verifying a state of a visualization component of the web application using a communication component of the web application. The instructions further include transmitting an event to the visualization component to modify the state of the visualization component using the communication component. The instructions further include determining that the web application has completely re-displayed in the graphical user interface of the web browser using the consistent global page state. The instructions further include verifying the modified state of the visualization component using the communication component.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, an automatic testing application can automatically test a web application that is displayed in a graphical user interface of a web browser, where the web application includes a web component, such as a Dynamic Hypertext Markup Language component, and a visualization component, such as an Adobe Flash® component, by simulating a user interaction with the web application. The automatic testing application can then verify a state of the visualization component of the web application based on the simulated user interaction.

As previously described, a web application can be tested to verify that the web application correctly displays in a web browser before the web application is put into production. However, testing a web application that includes more than one component (such as a web component and a visualization component), is generally difficult. This is because, while a human user will generally experience the same visual and interaction model across both components when interacting with a web application through a graphical user interface of a web browser, a computer software application will not have the same complete view when simulating the human user. This is because of independent display trees used by the web application to display both the web component and the visualization component of the web application.

For example, a computer software application can verify the presence of a button in a web component of the web application relatively easily using a display tree associated with the web component. However, it is much more difficult for the computer software application to verify the presence of a button in a visualization component of the web application because the button is not part of the display tree associated with the web component, and instead, is part of a display tree associated with the visualization component. In addition, because of the independent display trees used by different components of the web application, simulating an interaction between a button in a web component and a button in a visualization component will generally require separate programming interfaces for each display tree. Therefore, automating a cross-component interaction of a web application, in general, is difficult to implement, and, thus, automatic testing of cross-component interactions within a web application is rarely done.

In an embodiment of the invention, an automatic testing application can determine that both a web component and a visualization component of a web application has finished displaying in a graphical user interface of a web browser, and verify a state of the visualization component. The automatic testing application can then simulate a user interaction that modifies the state of the visualization component of the web application. The modification of the state of the visualization component can cause the web application to re-display itself in the graphical user interface of the web browser. The automatic testing application can then determine that each component of the web application has finished re-displaying, and verify the modified state of the visualization component. According to the embodiment, the automatic testing application can interact with the visualization component using a communication component of the web application.

As an example, a web application can include a visualization component that displays a bar graph that includes four bars in a graphical user interface of a web browser. The visualization component of the web application can display each bar in the bar graph using a color. For example, the web application can display each bar in the bar graph using a red color. The visualization component of the web application can also store a value for each bar in the bar graph. For example, the web application can store a value of 50 for each bar in the bar graph. Once the visualization component of the web application has finished displaying the bar graph, the automatic testing application can then verify the state of the visualization component. Specifically, in the example, the automatic testing application can receive a value associated with each bar in the bar graph, and determine whether each value is equal to an expected value of 50. Also in the example, the automatic testing application can receive a color associated with each bar in the bar graph and determine whether each color is equal to an expected color of red. If all of the bars are displayed in red and have a value of 50, then the visualization component of the web application is being displayed correctly. If one or more of the bars are displayed in a different color or have a different value, then the visualization component of the web application is being displayed incorrectly.

In the example, the automatic testing application can subsequently simulate a user interaction with the web application by transmitting an event to a web application, and thus, modify the state of the visualization component. Specifically, in the example, the automatic testing application can transmit an event that simulates a user "clicking" on one of the bars of the bar graph displayed by the visualization component. The event may cause the web application to re-display the bar graph in the visualization component. Specifically, the web application may display the bar that was "clicked" using a different color, and modify the value of the bar. For example, the web application may display the bar using a blue color, and may modify the value from 50 to 10. Once the visualization component of the web application has finished re-displaying the bar graph, the automatic testing application can then verify the modified state of the visualization component.

Specifically, in the example, the automatic testing application can receive a color and value associated with each bar in the bar graph, and determine whether the bar that was "clicked" is displayed using an expected color of red and has a value equal to an expected value of 10. If the "clicked" bar is displayed in blue and has a value of 10, then the visualization component of the web application is being displayed correctly. If the "clicked" bar is not displayed in blue or has a value different than 10, then the visualization component of the web application is being displayed incorrectly.

As previously described, a web application is a computer software application that is accessed over a network, such as the Internet or an intranet. In general, a web application is displayed on a graphical user interface of a web browser to a user. Examples of web browsers include an Internet Explorer® web browser, a Firefox® web browser, a Chrome® web browser, a Safari® web browser, and an Opera® web browser. A user of a web application is able to interact with the web application using a cursor control. Examples of cursor controls includes a computer mouse, an optical mouse, a touchpad, an optical touchpad, a trackball, a touchscreen, and a stylus.

A cursor control can be moved by the user. Such movement can include a single pressing down (or "click") of a cursor control button, a double pressing down (or "double click") of a cursor control button, a displacement of the cursor control to a different location, and a release of a cursor control button. A cursor control can send one or more events to the web application in response to a movement of the cursor control by the user. An event, as understood by one of ordinary skill in the relevant art, is a message that can be sent to a web application to indicate that an action has occurred, such as a movement of a cursor control. The web application can receive the one or more events sent by the cursor control and perform specified functionality based on the one or more events.

An example of the specified functionality, based on one or more events, is a manipulation of a visual icon displayed on the graphical user interface of the web browser by the web application. According to the example, a user can move a cursor control, such as clicking on a cursor control button, which causes the cursor control to send one or more events to the web application. The web application receives the one or more events and modifies the visual icon accordingly. For example, the web application can change the color of the visual icon in response to a user clicking on a cursor control button. As another example, the web application can update the display of a second visual icon in response to a user clicking on a cursor control button.

Web applications can include more than one component. A component of a web application, as understood by one of ordinary skill in the relevant art, is a collection of software modules that can provide the web application with specific functionality for displaying content in a graphical user interface of a web browser when executed by a processor, where the collection of software modules can encapsulate a set of related functions, data, or a combination of the two. A component can refer to the collection of software modules and can also refer to the content displayed in the graphical user interface of the web browser by the software modules when executed by the processor. Web applications that include more than one component generally include, at least, a web component and a visualization component.

A web component is a component that provides functionality relating to how content of a web application, such as one or more objects of the web application, is displayed to a user in a graphical user interface of a web browser. The web component can include a static markup language (such as HTML) which is a hierarchical tag structure that can include specific text elements, such as headings, paragraphs, and lists, and can support hyperlinks and embedded images. The web component can also include a scripting language (such as JavaScript) that can control a behavior of the web browser. The web component can also include a presentation definition language (such as Cascading Style Sheets ("CSS")) that can control an appearance and layout of text and web content in the web application. The web component can also include a document object model ("DOM"), that can represent and interact with objects in the web application. Examples of web components include an HTML component, a Dynamic Hypertext Markup Language ("DHTML") component, and an Extensible Hypertext Markup Language ("XHTML") component.

A visualization component is a component that provides functionality relating to displaying any type of visualization data, such as graphs, maps, and organization charts which utilize animation of text, drawings, and still images, as well as video, from within a web application. The visualization component can be implemented using a separate plug-in renderer in order to satisfy rich data visualization and interactivity requirements. The visualization component can capture user input using a cursor control, a keyboard, an audio control, or a video control. Examples of cursor controls have previously been described. Examples of audio controls include a microphone, and examples of video controls include a camera. The visualization component can manipulate vector and raster graphics to display multimedia from within the web application. Examples of plug-in technologies that can be part of a visualization component include an Adobe Flash® component, a Microsoft Silverlight® component, a Java® applet component, a Scalable Vector Graphics ("SVG") component, and a Synchronized Multimedia Integration Language ("SMIL") component.

According to an embodiment of the invention, a web application can display a web component and a visualization component within a graphical user interface of a web browser. According to one embodiment, the web component and the visualization component of the web application can be displayed adjacently within the graphical user interface of the web browser, so that the web component can be located in one portion of the graphical user interface, and the visualization component can be located in another portion of the graphical user interface.

According to the embodiment, a web component and a visualization component can be displayed by the web application within a graphical user interface of a web browser using a separate display tree for each component. As one of ordinary skill in the art would readily appreciate, a display tree is a tree structure that represents objects of a web application that are displayed by a component as visual icons in a graphical user interface of a web browser, where the tree structure can be used by a software module in displaying the visual icons when executed by a processor. An example of a display tree for a web component is an HTML DOM. In an embodiment, an HTML DOM can be used as a display tree when the web component is a DHTML component. An example of a display tree for a visualization component is an Adobe ActionScript® display list. In an embodiment, an Adobe ActionScript® display list can be used as a display tree when the visualization component is an Adobe Flash® component.

According to an embodiment, automatically testing a web application utilizes a third component, a communication component, of a web application. A communication component is a component that provides functionality for facilitating communication between a web component and a visualization component of a web application. According to the embodiment, while not displayed in a graphical user interface of a web browser, the communication component can act as an interface between the web component and a visualization component, allowing the web component to communicate with the visualization component, by transmitting data to, and receiving data from, the visualization component, and vice-versa. By utilizing the communication component, an automatic testing application can simulate interactions with the visualization component as well as the web component, as will be described in more detail.

As one of ordinary skill in the relevant art would appreciate, an interface is a point of interaction between two or more components. In one embodiment, a communication component is a JavaScript interface. However, this is merely an example, and, in alternate embodiments, a communication component can be any kind of interface.

Figure 1:
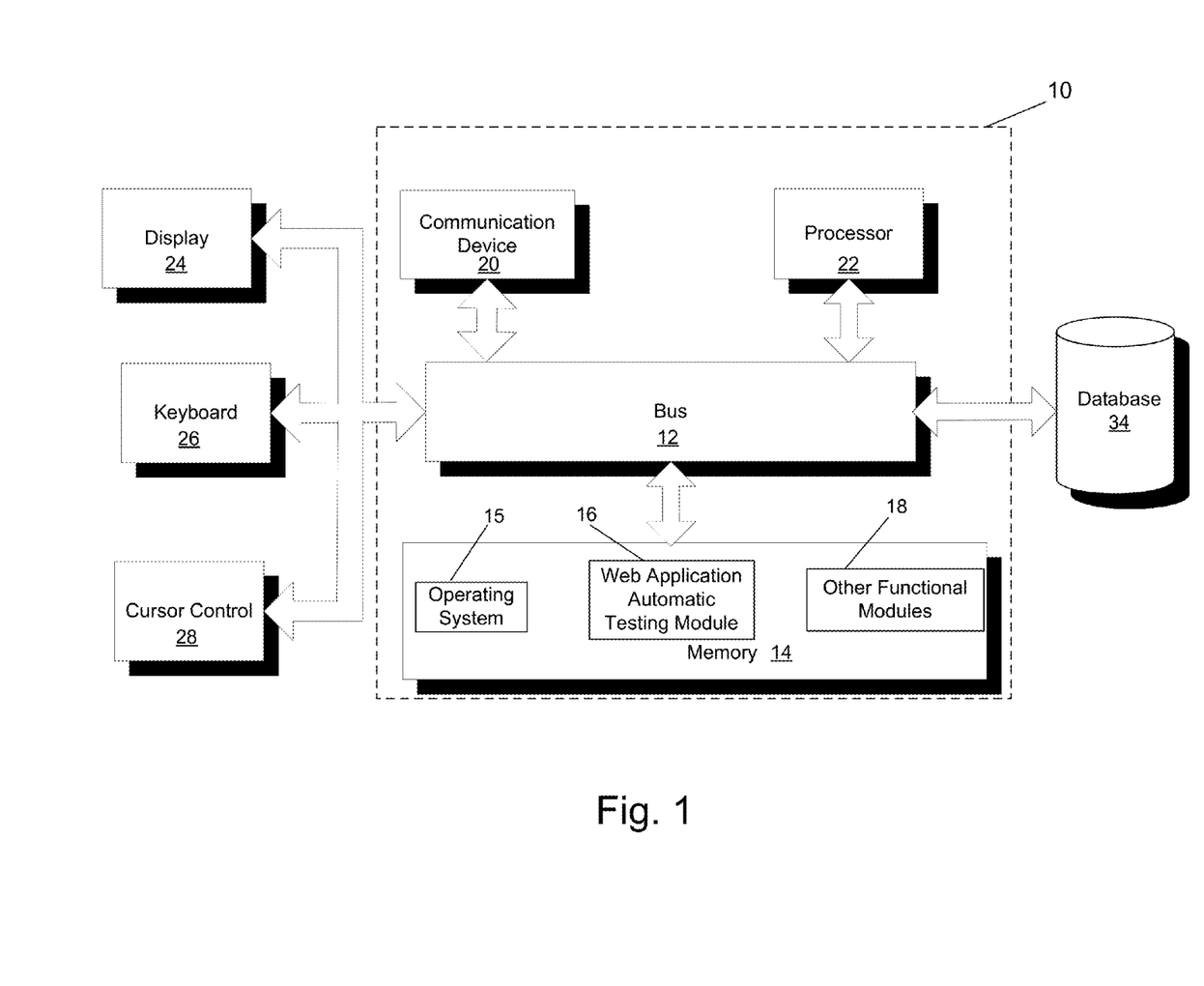
FIG. 1 illustrates a block diagram of a system that may implement an embodiment of the invention.

FIG. 1 illustrates a block diagram of a system 10 that may implement one embodiment of the invention. System 10 includes a bus 12 or other communication mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communication interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a web application automatic testing module 16, as well as other functional modules 18. Operating system 15 can provide an operating system functionality for system 10. Web application automatic testing module 16 can provide functionality for automatically testing a web application, as will be described in more detail below. System 10 can also be part of a larger system. Thus, system 10 can include one or more additional functional modules 18 to include the additional functionality. For example, functional modules 18 may include modules that are part of a development framework, such as the "Application Data Framework" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
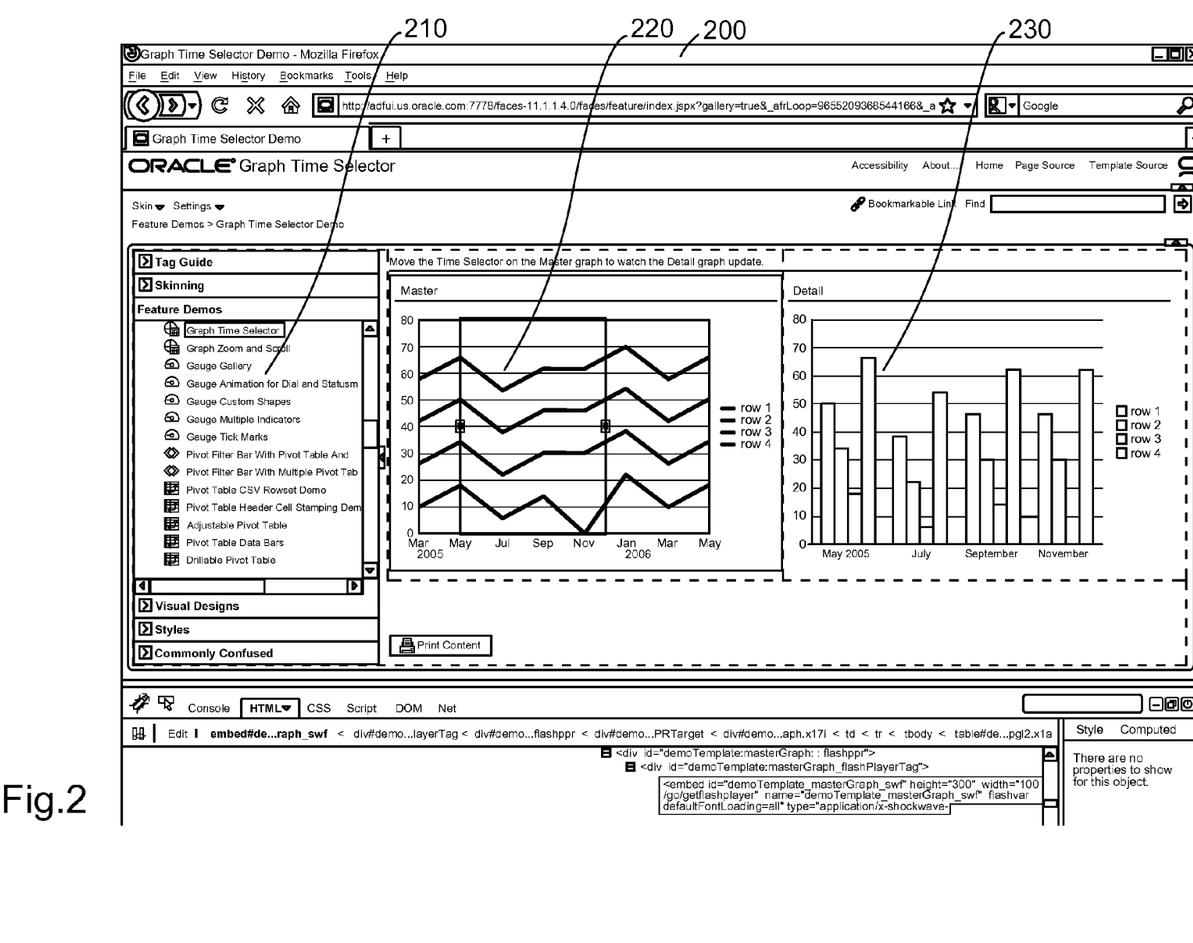
FIG. 2 illustrates a web application displayed in a graphical user interface of a web browser, where the web application includes a web component, a first visualization component, and a second visualization component, according to an embodiment of the invention.

FIG. 2 illustrates a web application 200 displayed in a graphical user interface of a web browser, where web application 200 includes a web component 210, a first visualization component 220, and a second visualization component 230, according to an embodiment of the invention. In the illustrated embodiment, web component 210 displays content that allows a user to select an object to be displayed as a visual icon in both first visualization component 220 and second visualization component 230. According to the embodiment, first visualization component 220 displays a master view of one or more objects, and second visualization component 230 displays a detail view of the one or more objects, where the master view of first visualization component 220 controls the detail view of second visualization component 230. More specifically, in the illustrated embodiment of FIG. 2, first visualization component 220 displays a master view of a graph, and second visualization component 230 displays a detail view of the graph. However, this is only an example embodiment, and one of ordinary skill in the art would readily appreciate that web component 210 can display any content of web application 200, and first visualization component 220 and second visualization component 230 can display any type of visualization data and still be within the scope of the invention.

According to the embodiment, a user can interact with web application 200 displayed in the graphical user interface of the web browser by moving a cursor control (not shown). Such movement of the cursor control can include the movements previously described. The movement of the cursor control can send one or more events to web application 200, which can receive the events and perform specified functionality based on the events. For example, a user can use a cursor control to "click" on a bar displayed within a graph of first visual component 220. The cursor control, in response, can send an event to web application 200, and web application, in response to the received event, can change a displayed color of the bar displayed within the graph of first visual component 220, and update a related table displayed within second visual component 230. However, this is only an example, and one of ordinary skill in the art would readily appreciate that web application 200 can perform any specified functionality in response to one or more received events, such as refreshing a visualization component that displays a geographical map with new data, and still be within the scope of the invention.

According to the embodiment, upon a loading of web application 200, web application 200 is displayed in the graphical user interface of a web browser. In one embodiment, content of web component 210, first visualization component 220, and second visualization component 230 can be downloaded by the web browser from a server (not shown) and displayed in the graphical user interface. In general, a web application is considered fully loaded after one or more web components have been downloaded and displayed in the graphical user interface by the web browser. However, visualization components are usually downloaded in parallel and displayed separately from web components, and thus, a web application may not be fully loaded until one or more visualization components are downloaded and displayed, even though the one or more web components have already been downloaded and displayed. Thus, in the illustrated embodiment of FIG. 2, web application 200 can complete its downloading and displaying of web component 210, first visualization component 220, and second visualization component 230 at different moments in time.

Also according to the embodiment, upon the loading of web application 200, web application 200 may have pending client or server asynchronous events. A client asynchronous event is an event initiated at a web browser that displays web application 200, such as a user-initiated interaction or an animation of an visual icon displayed in a graphical user interface of the web browser. A server asynchronous event is an event initiated at a server that web application 200 is downloaded from. An example of a server asynchronous event is a server response to a request by the web browser that displays web application 200.

According to an embodiment, in order to automatically test web application 200 in an automated and reliable manner, a consistent global page state can be used. A consistent global page state can be a value that is stored by a web application and that indicates that the web application has completely been displayed in a graphical user interface of a web browser. Without a consistent global page state, a state of a web application can be subject to change, and any verification of a state of a component of the web application can result in misleading results, as the state of the component can be subject to change. Furthermore, invoking a test action (such as a "click" of a cursor control button) may be dependent on a presence of an object in a component that may or may not be completely displayed as a visual icon in the graphical user interface of the web browser. Thus, in the illustrated embodiment of FIG. 2, a consistent global page state can indicate that all three components, web component 210, first visualization component 220, and second visualization component 230, have completely been displayed. Furthermore, in the illustrated embodiment of FIG. 2, a consistent global page state can indicate that there are no pending client or server asynchronous events.

In the illustrated embodiment of FIG. 2, web component 210 can be an HTML component, a DHTML component, or an XHTML component. Also in the illustrated embodiment, first visualization component 220 and second visualization component 230 can each be an Adobe Flash® component, a Microsoft Silverlight® component, a Java® applet component, a SVG component, or a SMIL component. While the illustrated embodiment of FIG. 2 includes one web component, and two visualization components, one of ordinary skill in the art would readily appreciate that this is merely an example of a web application according to an embodiment of the invention, and that in alternate embodiments, a web application can include any number of web components and visualization components and still be within the scope of the invention.

Figure 3:
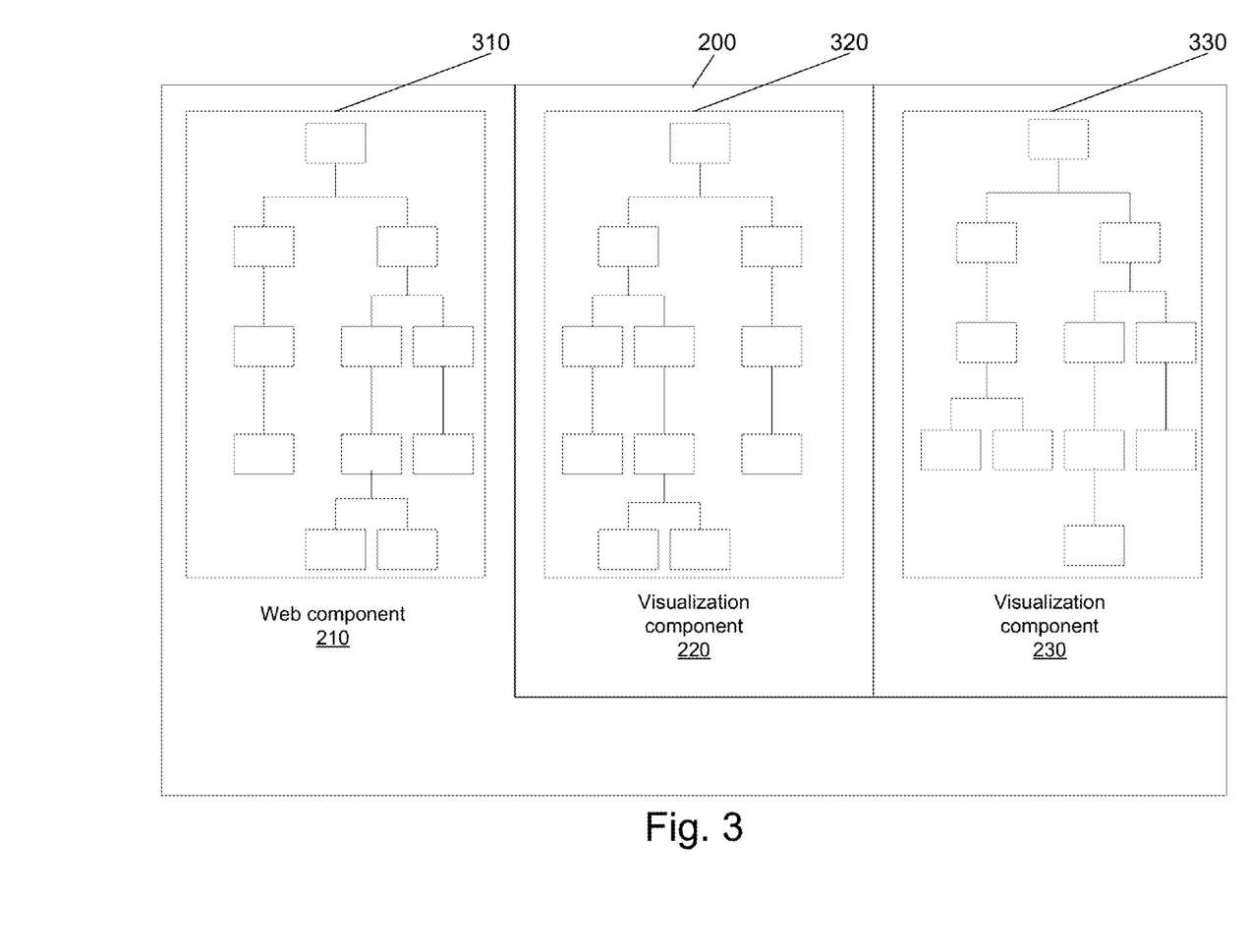
FIG. 3 illustrates a display tree for each of a web component, a first visualization component, and a second visualization component of a web application, according to an embodiment of the invention.

FIG. 3 illustrates a display tree for each of web component 210, first visualization component 220, and second visualization component 230 of web application 200, according to an embodiment of the invention. As previously described, a display tree is a tree structure that represents objects of a web application that are displayed by a component as visual icons in a graphical user interface of a web browser, where the tree structure can be used by a software module of the web application to display the visual icons in a graphical user interface of a web browser when executed by a processor. In contrast to FIG. 2, which illustrates objects displayed as visual icons in web component 210, first visualization component 220, and second visualization component 230 of web application 200, FIG. 3 illustrates a display tree for web component 210, first visualization component 220, and second visualization component 230 used to represent the objects displayed as visual icons in the graphical user interface of the web browser. Specifically, according to the embodiment, FIG. 3 illustrates display tree 310, which is a display tree for web component 210, display tree 320, which is a display tree for first visualization component 220, and display tree 330, which is a display tree for second visualization component 230.

According to the embodiment, display tree 310 represents objects of web application 200 that are displayed by web component 210 as visual icons. Display tree 310 includes a series of nodes that can be accessed through display tree 310. Contents of each node of display tree 310 can be modified or deleted, and new nodes of display tree 310 can be created. The nodes in display tree 310 have a hierarchical relationship to each other. According to an embodiment where web component 210 is a DHTML component, display tree 310 can be a HTML DOM node tree.

According to the embodiment, display tree 320 and display tree 330 represent objects of web application 200 that are displayed by first visualization component 220 and second visualization component 230, respectively, as visual icons. Similar to display tree 310, display tree 320 and display tree 330 each include a series of nodes that can be accessed by display tree 320 and display tree 330, respectively. Also similar to display tree 310, contents of each node of display tree 320 and display tree 330 can be modified or deleted, and new nodes of display tree 320 and display tree 330 can be created. According to an embodiment, where first visualization component 220 and second visualization component 230 are each an Adobe Flash® component, display tree 320 and display tree 330 can each be an Adobe ActionScript® display list.

In order to automatically simulate and test user interactions with first visualization component 220 and second visualization component 230 of web application 200, an automatic testing application needs to have access to display tree 320 and display tree 330 in order to verify that first visualization component 220 and second visualization component 230 correctly display in a graphical user interface of a web browser. In accordance with an embodiment of an invention, display tree 320 and display tree 330 can each be exposed to an automatic testing application which allows the automatic testing application to transmit an event to first visualization component 220 or second visualization component 230, and verify a state of first visualization component 220 or second visualization component 230. In one embodiment, a state includes one or more values associated with first visualization component 220 or second visualization component 230. In another embodiment, a state includes an image that represents first visualization component 220 or second visualization component 230. In one embodiment, verifying a state of first visualization component 220 or second visualization component 230 can include verifying a state of a object in display tree 320 or display tree 330. According to the embodiment, display tree 320 and display tree 330 can be exposed to an automatic testing application using a communication component (not shown) of web application 200, as will be described below in more detail. As will be also described in more detail, state verification can include receiving a string value from display tree 320 or display tree 330, or can include receiving an image from display tree 320 or display tree 330.

Figure 4:
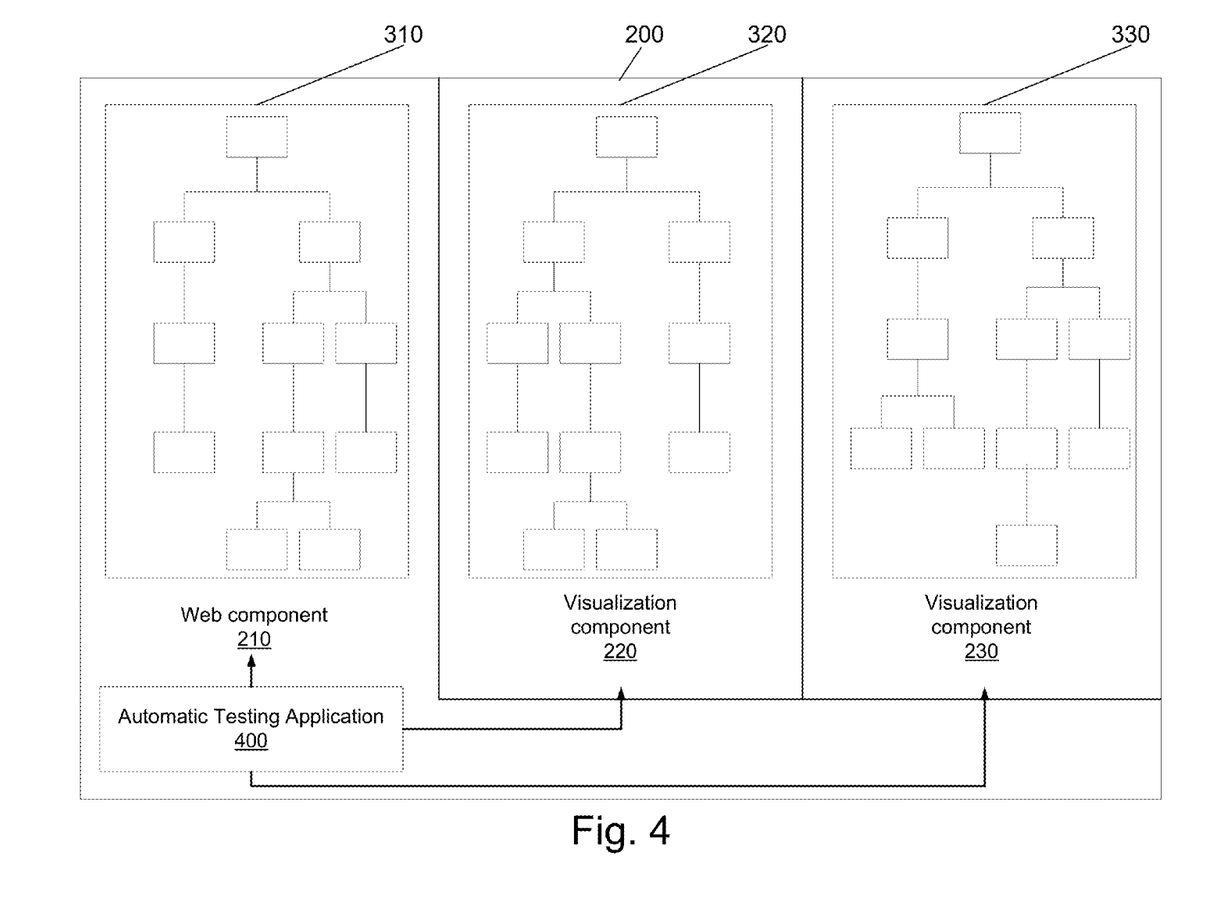
FIG. 4 illustrates an automatic testing application that interacts with a web component, a first visualization component, and a second visualization component of a web application, according to an embodiment of the invention.

FIG. 4 illustrates an automatic testing application 400 that interacts with web component 210, first visualization component 220, and second visualization component 230 of web application 200, according to an embodiment of the invention. According to the embodiment, automatic testing application 400 is a collection of software modules that, when executed by a processor, can simulate a user interaction with web application 200 and can verify that web application 200 is correctly displayed in a graphical user interface of a web browser. In one embodiment, automatic testing application 400 can be implemented by a web application automatic testing module 16 of FIG. 1.

According to an embodiment, before simulating a user interaction with web application 200, automatic testing application 400 determines that web application 200 has been completely displayed within a graphical user interface of a web browser. In one embodiment, automatic testing application 400 uses a consistent global page state to determine that web application 200 has been completely displayed. As previously discussed, a consistent global page state can be a value that is stored by a web application and indicates that the web application has completely been displayed in a graphical user interface of a web browser. More specifically, a consistent global page state indicates that every component of a web application has completely been displayed, and further indicates that there are no pending client or server asynchronous events. Thus, a consistent global page state can be a value that is stored in web application 200, and that is accessible by automatic testing application 400. In one embodiment, automatic testing application 400 can only simulate a user interaction with web application 200 when the consistent global page state has a value that indicates that web application 200 has been completely displayed.

Below is example pseudocode that can be utilized by automatic testing application 400 to determine a value of a consistent global page state according to an embodiment:
if (AdfPage.PAGE.isSynchronizedWithServer( )) { . . . .

However, one of ordinary skill in the art would readily appreciate that the above pseudocode is merely an example according to an embodiment, and that computer code for determining a value of a consistent global page state could take many different forms and still be within the scope of the invention.

Once automatic testing application 400 has determined that web application 200 has been completely displayed within a graphical user interface of a web browser, automatic testing application 400 can test that web application 200 has been correctly displayed. In one embodiment, automatic testing application 400 can automatically test that web application 200 has been correctly displayed by verifying a state of web component 210, by verifying a state of first visualization component 220, by verifying a state of second visualization component 230, or a combination thereof. According to the embodiment, verifying a state of a component includes receiving a state of the component from the component and comparing the received state of the component with an expected state of the component. In one example, a state of a component can include one or more values of a object displayed in the component as a visual icon. In another example, a state of a component can also include an image of an object displayed in the component as a visual icon.

According to the embodiment, automatic testing application 400 can verify a state of web component 210 by receiving the state of web component 210 and comparing the received state of web component 210 with an expected state. If the received state matches the expected state, then web component 210 is displayed correctly within the graphical user interface of the web browser. If the received state does not match the expected state, then web component 210 is displayed incorrectly. In one embodiment, the state of web component 210 includes one or more values of an object displayed within web component 210 as a visual icon. As an example, a value can be a string value. In another embodiment, the state of web component 210 includes an image of an object displayed within web component 210 as a visual icon. In one embodiment, the image can be a base 64 Portable Network Graphics ("PNG") image. In another embodiment, the image can be an encoded string, such as a base 64 encoded string. The object displayed within web component 210 as a visual icon can be an object of display tree 310. In the embodiment, display tree 310 is accessible to automatic testing application 400, and thus, a communication component is not necessary to verify a state of web component 210.

Below is example pseudocode that can be utilized by automatic testing application 400 to obtain a state of web component 210:

```
document.evaluate("/html/body/div[2]/div/form/div/div/div/div[3]/div/
div[5]/div/div/div[3]/div/div[2]/div/div[5]/div/div/div[3]/div/div[2]/div/
div/div[5]/div/div/div/div/div/div/div/div/div/div[2]/div/div/div/div/
div/div/div/div/div[2]/div/table/tbody/tr[7]/th/div", document, null,
XPathResult.ANY_TYPE, null).iterateNext( ).textContent
```

Below is another example of pseudocode that can be utilized by automatic testing application 400 to obtain a state of web component 210:
document.getElementById("demo:ptcb1").textContent However, one of ordinary skill in the art would readily appreciate that the above pseudocode are merely example according to certain embodiments, and that computer code for obtaining a state of web component 210 could take many different forms and still be within the scope of the invention.

According to the embodiment, automatic testing application 400 can verify a state of first visualization component 220 by receiving the state of visualization component 220 and comparing the received state of first visualization component 220 with an expected state. If the received state matches the expected state, then first visualization component 220 is displayed correctly within the graphical user interface of the web browser. If the received state does not match the expected state, then first visualization component 220 is displayed incorrectly. In one embodiment, the state of first visualization component 220 includes one or more values of an object displayed within first visualization component 220 as a visual icon. For example, a value can be a string value. In another embodiment, the state of first visualization component 220 includes an image of an object displayed within first visualization component 220 as a visual icon. The object displayed within first visualization component 220 as a visual icon can be an object of display tree 320. According to the embodiment, display tree 320 is not accessible to automatic testing application 400, and thus, automatic testing application 400 can utilize a communication component to verify a state of first visualization component 220. A communication component is described in greater detail in relation to FIG. 5.

Automatic testing application 400 can verify a state of second visualization component 230 in a similar manner in accordance with another embodiment. In the embodiment, the state of second visualization component 230 includes one or more values of an object displayed within second visual-ization component 230 as a visual icon, where the object can be an object of display tree 330. According to the embodiment, display tree 330 is not accessible to automatic testing application 400, and thus, automatic testing application 400 can utilize a communication component to verify a state of second visualization component 230, where a communication component is described in greater detail in relation to FIG. 5.

Below is example pseudocode that can be utilized by automatic testing application 400 to obtain a state of either first visualization component 220 or second visualization component 230:

```
if (AdfPage.PAGE.isSynchronizedWithServer( )) {
//Master
document.getElementById("demoTemplate_masterGraph_swf").
getInfo("title.text");
//0x00ff00
document.getElementById("demoTemplate_masterGraph_swf").
getInfo("line[3].color");
//row 2
document.getElementById("demoTemplate_detailGraph_swf").
getInfo("legendmarker[1].text");
//50
document.getElementById("demoTemplate_masterGraph_swf").
getInfo("bar[0][0].value");
}
```

However, one of ordinary skill in the art would readily appreciate that the above pseudocode is merely an example according to an embodiment, and that computer code for obtaining a state of either first visualization component 220 or second visualization component 230 could take many different forms and still be within the scope of the invention.

After automatic testing application 400 has completed testing that web application 200 has been correctly displayed, automatic testing application 400 can simulate a user interaction with web application 200. In one embodiment, simulating a user interaction with web application 200 can include transmitting an event to web application 200, where the event represents a movement of a cursor control by a user. Examples of a movement of a cursor control include a click of a cursor control button, a double click of a cursor control button, a displacement of the cursor control to a different location, and a release of a cursor control button. According to the embodiment, web application 200 treats the event transmitted by automatic testing application 400 as an event sent by a cursor control and performs specified functionality. Examples of such specified functionality include modifying a object displayed as a visual icon on the graphical user interface of the web browser by web application 200, such as changing the color of the object displayed as a visual icon.

In one embodiment, automatic testing application 400 can simulate a user interaction with web application 200 by transmitting an event to web component 210, by transmitting an event to first visualization component 220, by transmitting an event to second visualization component 230, or a combination thereof. According to the embodiment, transmitting an event to a component can modify the state of the component.

According to the embodiment, automatic testing application 400 can transmit an event to web component 210. The transmittal of an event to web component 210 can modify a state of web component 210. In one embodiment, the transmittal of an event to web component 210 can modify a state of web component 210 by modifying one or more values of an object displayed within web component 210 as a visual icon. The object displayed within web component 210 as a visual icon can be an object of display tree 310. In the embodiment, display tree 310 is accessible to automatic testing application 400, and thus, a communication component is not necessary to transmit an event to web component 210.

Below is another example of pseudocode that can be utilized by automatic testing application 400 to transmit an event to web component 210: document.getElementById("demo:ptcb1").click( )//Clicks on the Print Content button However, one of ordinary skill in the art would readily appreciate that the above pseudocode is merely an example according to an embodiment, and that computer code for transmitting an event to web component 210 could take many different forms and still be within the scope of the invention.

According to the embodiment, automatic testing application 400 can transmit an event to first visualization component 220. The transmittal of an event to first visualization component 220 can modify a state of first visualization component 220. In one embodiment, the transmittal of an event to first visualization component 220 can modify a state of first visualization component 220 by modifying one or more values of an object displayed within first visualization component 220 as a visual icon. The object displayed within first visualization component 220 as a visual icon can be an object of display tree 320. According to the embodiment, display tree 320 is not accessible to automatic testing application 400, and thus, automatic testing application 400 can utilize a communication component to transmit an event to first visualization component 220. A communication component is described in greater detail in relation to FIG. 5.

Automatic testing application 400 can transmit an event to second visualization component 230 in a similar manner in accordance with another embodiment. In the embodiment, the transmittal of an event to second visualization component 230 modifies one or more values of an object displayed within second visualization component 230 as a visual icon, where the object can be an object of display tree 330. According to the embodiment, display tree 330 is not accessible to automatic testing application 400, and thus, automatic testing application 400 can utilize a communication component to transmit an event to second visualization component 230, where a communication component is described in greater detail in relation to FIG. 5. In an alternate embodiment, the transmittal of an event to second visualization component 230 can cause an asynchronous event to occur at second visualization component 230. The asynchronous event at second visualization component 230 can modify one or more additional values of an object displayed within second visualization component 230, where the object can be an object of display tree 330.

Below is another example of pseudocode that can be utilized by automatic testing application 400 to transmit an event to either first visualization component 220 or second visualization component 230:

```
if (AdfPage.PAGE.isSynchronizedWithServer( )) {
    // Click on a legend marker to show/hide bars
    document.getElementById("demoTemplate_detailGraph_swf").
    fireEvent("legendmarker[0]", AdfDvtGraph.CLICK);
    // Mouse over to verify tooltips
    document.getElementById("demoTemplate_masterGraph_swf").
    fireEvent("line[1]", AdfDvtGraph.MOUSE_OVER);
    // Note: isSynchronizedWithServer needs to be called again before
    verifying the rendering results of the interaction
}
```

However, one of ordinary skill in the art would readily appreciate that the above pseudocode is merely an example according to an embodiment, and that computer code for transmitting an event to either first visualization component 220 or second visualization component 230 could take many different forms and still be within the scope of the invention.

According to the embodiment, after simulating a user interaction with web application 200, web application 200 can be re-displayed on a graphical user interface of a web browser. In this embodiment, automatic testing application 400 can determine that web application 200 has been completely re-displayed within a graphical user interface of a web browser, and can automatically test that web application 200 has been correctly displayed, as previously described.

Figure 5:
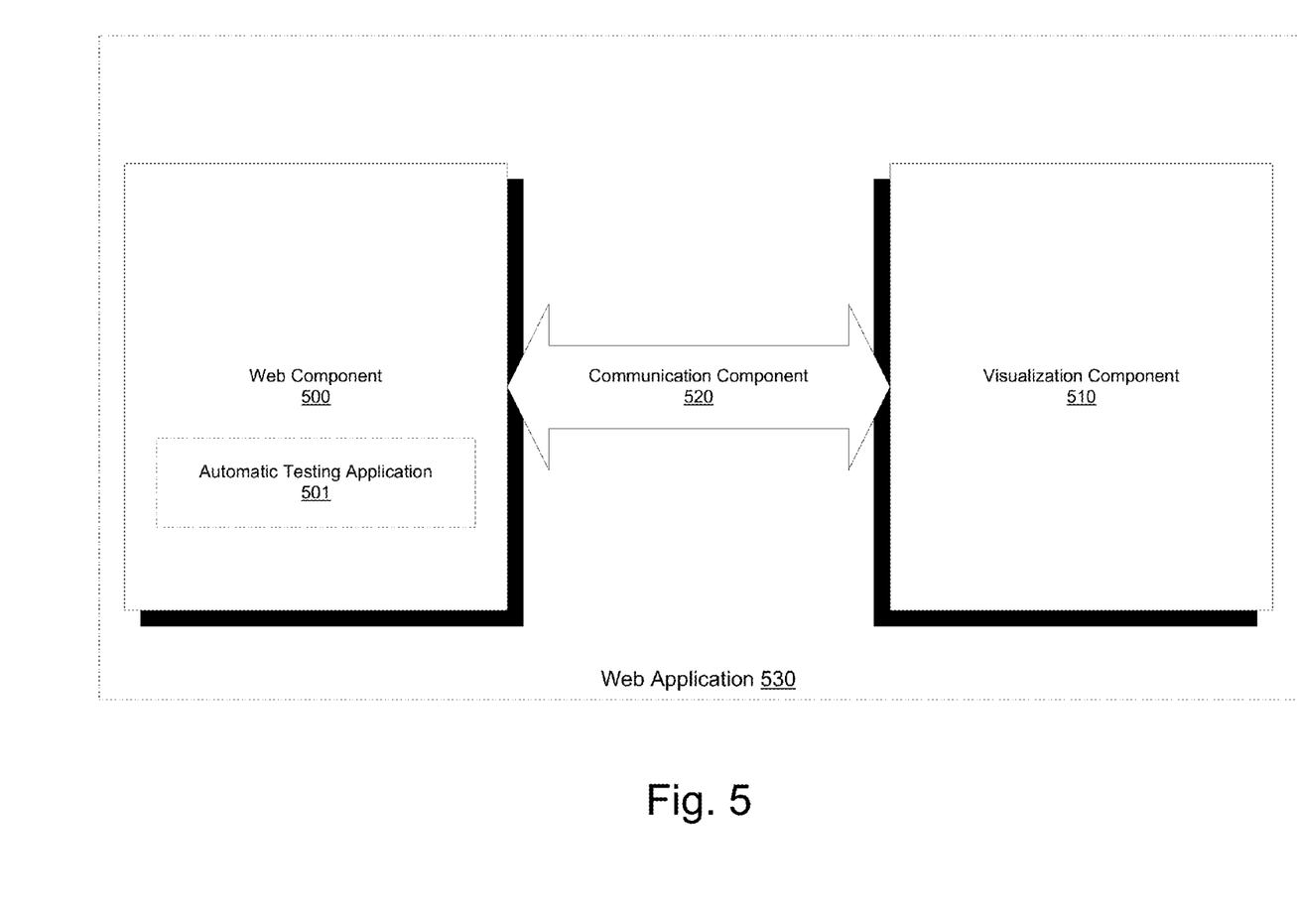
FIG. 5 illustrates an automatic testing application that interacts with a web component of a web application, and interacts with a visualization component of a web application utilizing a communication component, according to an embodiment of the invention.

FIG. 5 illustrates an automatic testing application 501 that interacts with a web component 500 of a web application 530, and interacts with a visualization component 510 of web application 530 utilizing a communication component 520, according to an embodiment of the invention. According to the embodiment, communication component 520 can act as a bridge between web component 500 and visualization component 510. Thus, automatic testing application 501, which has access to web component 500, can transmit data to visualization component 510 using communication component 520. In addition, automatic testing application 501 can receive data from visualization component 510 using communication component 520. According to an embodiment, a communication component is a JavaScript interface. However, this is merely an example, and, in alternate embodiments, a communication component can be any kind of interface.

Automatic testing application 501 can transmit and receive different kinds of data to and from visualization component 510 using communication component 520 according to alternate embodiments. In one embodiment, the data can include one or more string values, where the one or more string values correspond to one or more values of an object displayed in visualization component 510 as a visual icon. When the data includes a plurality of string values, in one embodiment, the plurality of string values can be packaged as an extensible markup language ("XML") document. According to the embodiment, the one or more string values can provide a quick way for automatic testing application 501 to verify that an object displayed in visualization component 510 displays correctly. An example of a string value that corresponds to an object displayed in visualization component 510 is:

"CB F O1L O1L O1L O1L O1L O1L O1L O1L O1L O1L Y1L Y1L Y1L Y1L Y1L Y1L Y1L Y1L Y1L Y1L O1AxisLine Y1AxisLine Y1MG Y1MG Y1MG Y1MG Y1MG Y1MG Y1MG Y1MG LR LR LR LR LA LeM LeM LeM LeM LT LT LT LT Title Other Other Other TimeSelector"

In another embodiment, the data can include one or more images, where the one or more images correspond to one or more images of an object displayed in visualization component 510 as a visual icon. When the data includes one or more images, in one embodiment, each image of the one or more images can be packaged as a bitmap. In one embodiment, the one or more images can be PNG images. In another embodiment, the one or more images can be encoded strings that represent images, such as base 64 encoded strings. According to the embodiment, the one or more images allow automatic testing application 501 to verify that an object displayed in visualization component 510 rendered correctly. By the use of one or more images, automatic testing application 501 can identify any visual regression that might otherwise require manual intervention, such as a minor difference in a received image as compared to an expected image.

Figure 6:
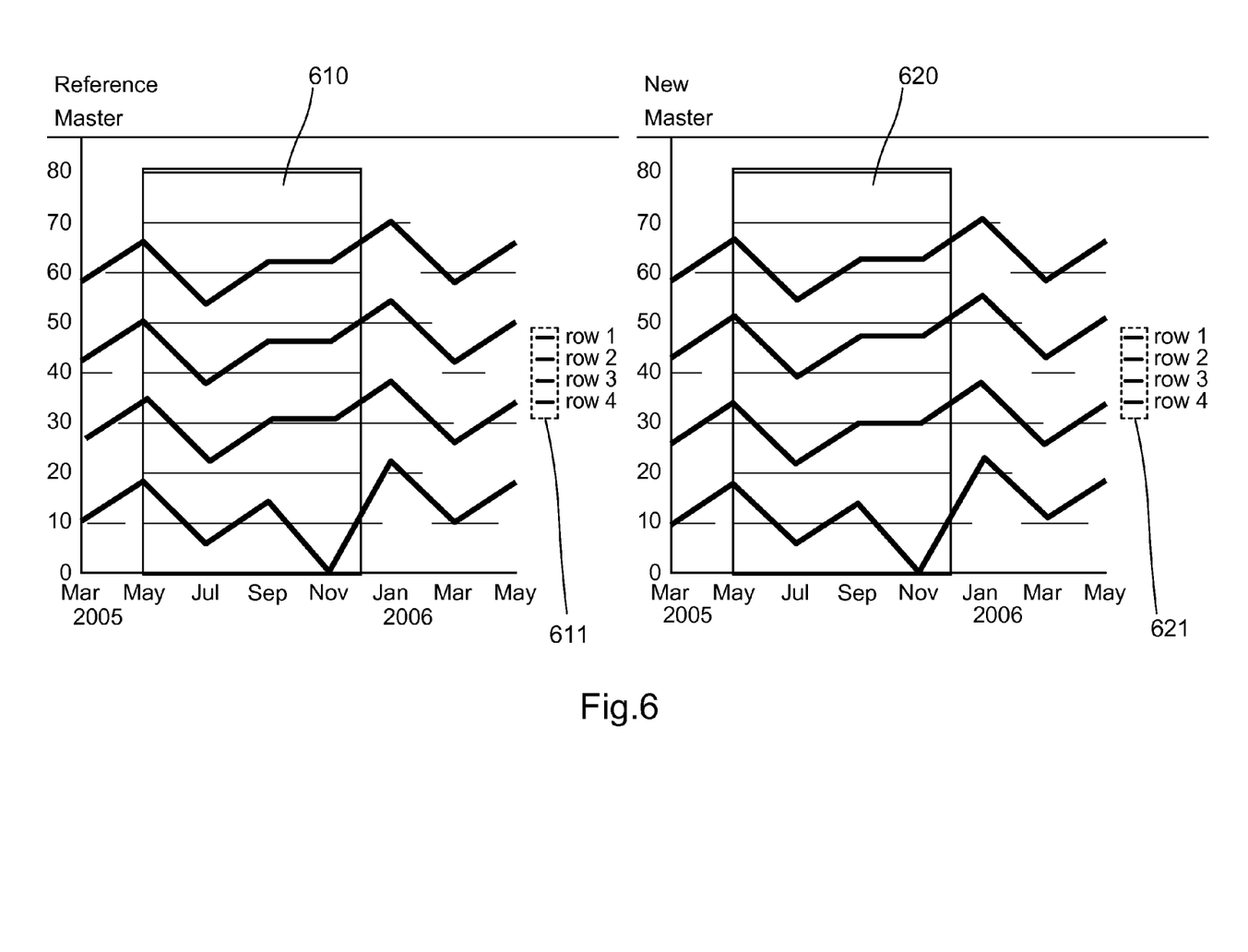
FIG. 6 illustrates an example of image that can be transmitted to and from a visualization component using a communication component according to an embodiment of the invention.

FIG. 6 illustrates an example of image that can be transmitted to and from a visualization component using a communication component according to an embodiment of the invention. More specifically, FIG. 6 illustrates image 610, which is an expected image of a visualization component, and image 620, which is an actual image of a visualization component. In the illustrated embodiment, there is a minor difference in a shape of legend 611 of image 610, as compared to a shape of legend 621 of image 620. By receiving image 620 using a communication component, an automatic testing application can compare image 620 with image 610, and identify that image 620 is different from image 610. In one embodiment, the fact that image 620 is different from image 610 can also identify that the visualization component is not displaying correctly. According to an embodiment, the automatic testing application can automatically compare a received image with an expected image.

As previously described, a consistent global page state can be a value that is stored by a web application and that indicates that the web application has completely been displayed in a graphical user interface of a web browser. Without a consistent global page state, a state of a web application can be subject to change, and any verification of a state of a visualization component of the web application can result in misleading results, as the state of the visualization component can be subject to change. This can be particularly important in an embodiment where a state of a visualization component includes one or more images so as to prevent any false verification of the state of the visualization component. For example, an automatic testing application can perform a verification of a state of the visualization component of the web application before the web application has completely displayed. Another component of the web application may trigger a state change in the visualization component, causing one or more images that comprise the state of the visualization component to change. Thus, the verification of the visualization component can be based on an incomplete state of the visualization component if a consistent global page state is not used.

Figure 7:
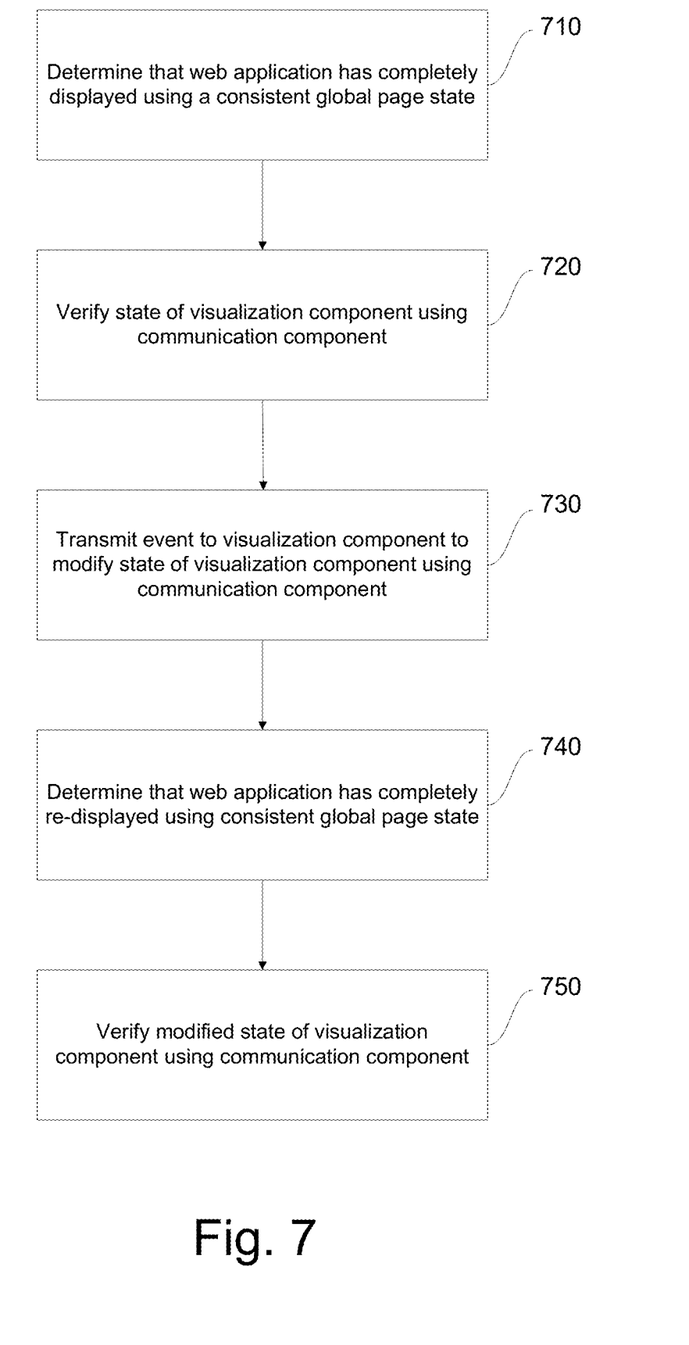
FIG. 7 illustrates a flow diagram of the functionality of a web application automatic testing module according to an embodiment of the invention.

FIG. 7 illustrates a flow diagram of the functionality of a web application automatic testing module according to an embodiment of the invention. In one embodiment, the functionality of the flow diagram of FIG. 7 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to the embodiment, an automatic testing application can simulate a user interaction with a web application, and the automatic testing application can verify that the web application correctly displays in a graphical user interface of a web browser, as illustrated in the flow diagram of FIG. 7. At 710, the automatic testing application determines that a web application has completely displayed in the graphical user interface using a consistent global page state. In the embodiment, the web application can include a web component and a visualization component. In one embodiment, the web component is a DHTML component, and the visualization component is an Adobe Flash® component. In one embodiment, the web component can be displayed in the graphical user interface using a first display tree, and the visualization component can be displayed using a second display tree.

According to the embodiment, a consistent global page state can be a value stored by the web application that indicates the web component and the visualization component of the web application have completely displayed in the graphical user interface. According to an alternate embodiment, a consistent global page state can also indicate that there are no pending client or server asynchronous events within the web application.

At 720, the automatic testing application verifies a state of a visualization component of the web application using a communication component. In an embodiment, the automatic testing application verifies the state of the visualization component by receiving the state of the visualization component from the communication component and comparing the received state with an expected state. If the received state matches the expected state, this indicates that the visualization component is displayed correctly within the graphical user interface of the web browser. If the received state does not match the expected state, this indicates that the visualization component is displayed incorrectly within the graphical user interface of the web browser.

In one embodiment, the state of the visualization component includes one or more values of an object displayed within the visualization component as a visual icon. Each value of the one or more values of the object can be, for example, a string value. In another embodiment, the state of the visualization component includes an image of the object displayed within the visualization component as a visual icon. In one embodiment, the visualization component can include a display tree, and the object displayed within the visualization component as a visual icon is an object of the display tree.

According to an embodiment, the state of the visualization component is transmitted over the communication component. In one embodiment, the communication component is a JavaScript interface.

At 730, the automatic testing application transmits an event to the visualization component of the web application to modify the state of the visualization component using the communication component. According to an embodiment, the transmittal of the event to the visualization component can modify the state of the visualization component by modifying one or more values of an object displayed within the visualization component as a visual icon. The object displayed within the visualization component as a visual icon can be an object of a display tree within the visualization component. According to the embodiment, the automatic testing application transmits the event over the communication component.

At 740, the automatic testing application determines that the web application has completely re-displayed in the graphical user interface of the web browser using the consistent global page state. According to the embodiment, the transmittal of the event to the visualization component and the modification of the state of the visualization component can cause the web application to re-display in the graphical user interface.

At 750, the automatic testing application verifies the modified state of the visualization component of the web application using the communication component. In an embodiment, the automatic testing application verifies the modified state of the visualization component by receiving the modified state of the visualization component from the communication component and comparing the received modified state with an expected modified state. If the received modified state matches the expected modified state, this indicates that the visualization component is displayed correctly within the graphical user interface of the web browser. If the received modified state does not match the expected modified state, this indicates that the visualization component is displayed incorrectly within the graphical user interface of the web browser. According to an embodiment, the modified state of the visualization component is transmitted over the communication component.

Thus, in accordance with an embodiment, a testing application is provided that can automatically test a complex web application containing multiple components, including one or more visualization components, where all of the multiple components may not be in a consistent state at the same time. In addition, through the use of a communication component, a display tree interface can be provided over different visualization components, which can significantly reduce source code instrumentation in the testing application.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically test a web application, the automatic testing comprising:

determining that the web application has completely displayed in a graphical user interface of a web browser using a consistent global page state, wherein the web application comprises a web component and a visualization component, wherein the web component is displayed in the graphical user interface using a first display tree, and wherein the visualization component is displayed using a second display tree;

verifying that the visualization component is displayed correctly within the graphical user interface by receiving a state of the visualization component of the web application from a communication component of the web application, and comparing the received state with an expected state;

transmitting an event to the visualization component to modify the state of the visualization component using the communication component;

determining that the web application has completely re-displayed in the graphical user interface of the web browser using the consistent global page state; and verifying that the modified visualization component is displayed correctly within the graphical user interface by receiving the modified state of the visualization component from the communication component, and comparing the received modified state with an expected modified state.

2. The non-transitory computer-readable medium of claim 1, wherein the web component comprises a dynamic hypertext markup language component, wherein the visualization component comprises a multimedia component, and wherein the communication component comprises a JavaScript interface.

3. The non-transitory computer-readable medium of claim 1, wherein the consistent global page state comprises a value stored by the web application that indicates the web component and the visualization component have completely displayed in the graphical user interface.

4. The non-transitory computer-readable medium of claim 1, wherein the verifying the state of the visualization component further comprises receiving the state of the visualization component from the communication component and comparing the received state with an expected state.

5. The non-transitory computer-readable medium of claim 4, wherein, when the received state matches the expected state, the visualization component is displayed correctly within the graphical user interface; and wherein, when the received state does not match the expected state, the visualization component is displayed incorrectly within the graphical user interface.

6. The non-transitory computer-readable medium of claim 4, wherein the state of the visualization component comprises one or more values of an object displayed within the visualization component.

7. The non-transitory computer-readable medium of claim 4, wherein the state of the visualization component comprises an image of an object displayed within the visualization component.

8. The non-transitory computer-readable medium of claim 1, wherein an object displayed within the visualization component comprises an object of the display tree of the visualization component.

9. The non-transitory computer-readable medium of claim 1, wherein the transmitting the event to the visualization component modifies the state of the visualization component by modifying one or more values of an object displayed within the visualization component; and wherein the transmitting the event to the visualization component comprises transmitting the event over the communication component.

10. The non-transitory computer-readable medium of claim 1, wherein the transmitting of the event to the visualization component and the modifying the state of the visualization component cause the web application to re-display in the graphical user interface.

11. The non-transitory computer-readable medium of claim 1, wherein the verifying the modified state of the visualization component further comprises receiving the modified state of the visualization component from the communication component and comparing the received modified state with an expected modified state.

12. The non-transitory computer-readable medium of claim 11,
wherein, when the received modified state matches the expected modified state, the visualization component is displayed correctly within the graphical user interface; and
wherein, when the received modified state does not match the expected modified state, the visualization component is displayed incorrectly within the graphical user interface.

13. A computer-implemented method for automatically testing a web application, the computer-implemented method comprising:
determining that the web application has completely displayed in a graphical user interface of a web browser using a consistent global page state, wherein the web application comprises a web component and a visualization component, wherein the web component is displayed in the graphical user interface using a first display tree, and wherein the visualization component is displayed using a second display tree;
verifying that the visualization component is displayed correctly within the graphical user interface b receiving a state of the visualization component of the web application from a communication component of the web application, and comparing the received state with an expected state;
transmitting an event to the visualization component to modify the state of the visualization component using the communication component;
determining that the web application has completely re-displayed in the graphical user interface of the web browser using the consistent global page state; and
verifying that the modified visualization component is displayed correctly within the graphical user interface by receiving the modified state of the visualization component from the communication component, and comparing the received modified state with an expected modified state.

14. The computer-implemented method of claim 13, wherein the verifying the state of the visualization component further comprises receiving the state of the visualization component from the communication component and comparing the received state with an expected state.

15. The computer-implemented method of claim 13,
wherein the transmitting the event to the visualization component modifies the state of the visualization component by modifying one or more values of an object displayed within the visualization component; and
wherein the transmitting the event to the visualization component comprises transmitting the event over the communication component.

16. The computer-implemented method of claim 13, wherein the verifying the modified state of the visualization component further comprises receiving the modified state of the visualization component from the communication component and comparing the received modified state with an expected modified state.

17. A system comprising:
a memory configured to store a collection of software modules; and
a processor configured to execute the collection of software modules stored on the memory;
wherein the processor is further configured, when executing the collection of software modules stored on the memory, to:
determine that the web application has completely displayed in a graphical user interface of a web browser using a consistent global page state, wherein the web application comprises a web component and a visualization component, wherein the web component is displayed in the graphical user interface using a first display tree, and wherein the visualization component is displayed using a second display tree;
verify that the visualization component is displayed correctly within the graphical user interface by receiving a state of the visualization component of the web application from a communication component of the web application, and comparing the received state with an expected state;
transmit an event to the visualization component to modify the state of the visualization component using the communication component;
determine that the web application has completely re-displayed in the graphical user interface of the web browser using the consistent global page state; and
verify that the modified visualization component is displayed correctly within the graphical user interface by receiving the modified state of the visualization component from the communication component, and comparing the received modified state with an erected modified state.

18. The system of claim 17, wherein the processor is further configured, when executing the collection of software modules stored on the memory, to receive the state of the visualization component from the communication component and compare the received state with an expected state.

19. The system of claim 17, wherein the processor is further configured, when executing the collection of software modules stored on the memory, to:
modify one or more values of an object displayed within the visualization component; and
transmit the event over the communication component.

20. The system of claim 17, wherein the processor is further configured, when executing the collection of software modules stored on the memory, to receive the modified state of the visualization component from the communication component and compare the received modified state with an expected modified state.

* * * * *

UNITED STATES PATENT AND TRADEMARK OFFICE
CERTIFICATE OF CORRECTION

PATENT NO. : 8,572,505 B2  Page 1 of 1
APPLICATION NO. : 13/017310
DATED : October 29, 2013
INVENTOR(S) : Lee et al.

It is certified that error appears in the above-identified patent and that said Letters Patent is hereby corrected as shown below:

In the Specification

In column 13, line 8, delete "click()//" and insert -- click();// --, therefor.

Signed and Sealed this
Third Day of June, 2014

Michelle K. Lee
*Deputy Director of the United States Patent and Trademark Office*